United States Patent
Chen

(10) Patent No.: US 6,318,197 B1
(45) Date of Patent: Nov. 20, 2001

(54) SPEED CHANGEABLE GEAR DRIVE APPARATUS FOR A WHEELED VEHICLE

(76) Inventor: Sen-Jung Chen, No. 236, Sec. 3, Ho-Ping W. Rd., Taipei City (TW)

( * ) Notice: Subject to any disclaimer, the term of this patent is extended or adjusted under 35 U.S.C. 154(b) by 0 days.

(21) Appl. No.: 09/574,991

(22) Filed: May 19, 2000

(30) Foreign Application Priority Data

Mar. 9, 2000 (TW) ................................................ 89203737

(51) Int. Cl.$^7$ .................................................... F16H 3/08
(52) U.S. Cl. ............................................... 74/333; 74/331
(58) Field of Search ............................. 74/333, 331, 332

(56) References Cited

U.S. PATENT DOCUMENTS 5,000,057 * 3/1991 Tseng ....................................... 74/359
5,297,450 * 3/1994 MacPherson ............................ 74/333

* cited by examiner

Primary Examiner—Sherry Estremsky
Assistant Examiner—Tisha D. Lewis

(74) Attorney, Agent, or Firm—Christie, Parker & Hale, LLP

(57) ABSTRACT

A speed changeable gear drive apparatus is transmits a drive of an output shaft of an electrically powered motor to drive a wheeled vehicle. The apparatus includes a drive shaft coupling with the output shaft to rotate about a first axis and having first and second driving gears with different numbers of teeth. A driven shaft with a second axis is disposed parallel to the drive shaft. A first driven gear is secured on the driven shaft, meshes with the first driving gear, and has a first hub portion provided with a plurality of first spline members. An annular bearing member is sleeved on the first hub portion. A second driven gear is mounted on the driven shaft, meshes with the second driving gear, and has a second hub portion provided with a plurality of second spline members, and an annular anchoring member extending from the second hub portion towards the first driven gear. An annular coupling member is sleeved on and is retainingly shiftable relative to the driven shaft along the second axis, and includes an output end portion adapted to drive the wheeled vehicle, and a splined end portion. When the coupling member is shifted to a first position or a second position by a shifting member, the splined end portion is coupled with the first spline members or with the second spline members so as to transmit the drive of the first driving gear or the second driving gear to the output end portion.

5 Claims, 4 Drawing Sheets

SPEED CHANGEABLE GEAR DRIVE APPARATUS FOR A WHEELED VEHICLE

BACKGROUND OF THE INVENTION

1. Field of the Invention

This invention relates to a speed changeable gear drive apparatus, more particularly to a speed changeable gear drive apparatus for transmitting a drive of an output shaft of an electrically powered motor to drive a wheeled vehicle.

2. Description of the Related Art

A conventional motorcar includes a mechanical drive apparatus for transmitting a drive of an output shaft of an electrically powered motor to a differential gear device to drive the wheel axles of the motorcar. Moreover, a motor frequency changer is provided to control the rotary speed of the output shaft of the electrically powered motor. However, the motor frequency changer is expensive and is liable to cause damage after a long term of use.

SUMMARY OF THE INVENTION

The object of the present invention is to provide a speed changeable gear drive apparatus which can transmit a drive of an output shaft of an electrically powered motor while dispensing with the need for using a motor frequency changer.

According to this invention, the speed changeable gear drive apparatus includes a pair of frame supports which are spaced apart from each other in an axial direction such that a drive shaft is journalled thereon with a first axis oriented in the axial direction. The drive shaft is adapted to couple with and is driven by an output shaft to rotate about the first axis. First and second driving gears respectively have first and second teeth in different number, and are mounted in tandem on the drive shaft so as to be rotatable therewith. A driven shaft with a second axis is disposed parallel to the drive shaft to be journalled relative to the frame supports, and includes left and right end portions and an intermediate portion interposed therebetween. A first driven gear is mounted on the left end portion, and is rotatable with the driven shaft. The first driven gear has a first rim portion with third teeth thereon to mesh with the first teeth, and a first hub portion which includes a first outer annular wall radially spaced apart from the first rim portion, and a first inner annular wall opposite to the first outer annular wall radially. The first inner annular wall is disposed around and is spaced apart from the left end portion so as to define an annular coupling area. A plurality of first spline members are disposed on the first inner annular wall of the first driven gear and are angularly displaced from one another. An annular bearing member has an inner annular race sleeved on and rotatable with the first outer annular wall, and an outer annular race opposite to and rotatable relative to the inner annular race and spaced apart from the first rim portion radially to define an annular accommodation area. A second driven gear is mounted on the intermediate portion of the driven shaft, and includes a second rim portion with fourth teeth formed thereon to mesh with the second teeth of the second driving gear, and a second hub portion which includes a second inner annular wall radially opposite to the second rim portion, and a second intermediate annular portion interposed between the second rim portion and the second inner annular wall. An annular anchoring member is disposed to be coaxial to and extends from the second intermediate annular portion of the second hub portion and towards the first driven gear and into the annular accommodation area so as to be sleeved on and be rotatable with the outer annular race of the annular bearing member. A plurality of second spline members are disposed on the second inner annular wall of the second hub portion and are angularly displaced from one another. An annular coupling member is sleeved on and is retainingly shiftable relative to the driven shaft along the second axis. The annular coupling member includes an output end portion adapted to drive a wheeled vehicle, and a splined end portion spaced apart from the output end portion along the second axis. As such, when the annular coupling member is shifted to a first position or a second position by a shifting member, the splined end portion is coupled with the first spline members or with the second spline members so as to transmit the drive of the first driving gear or the second driving gear to the output end portion.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
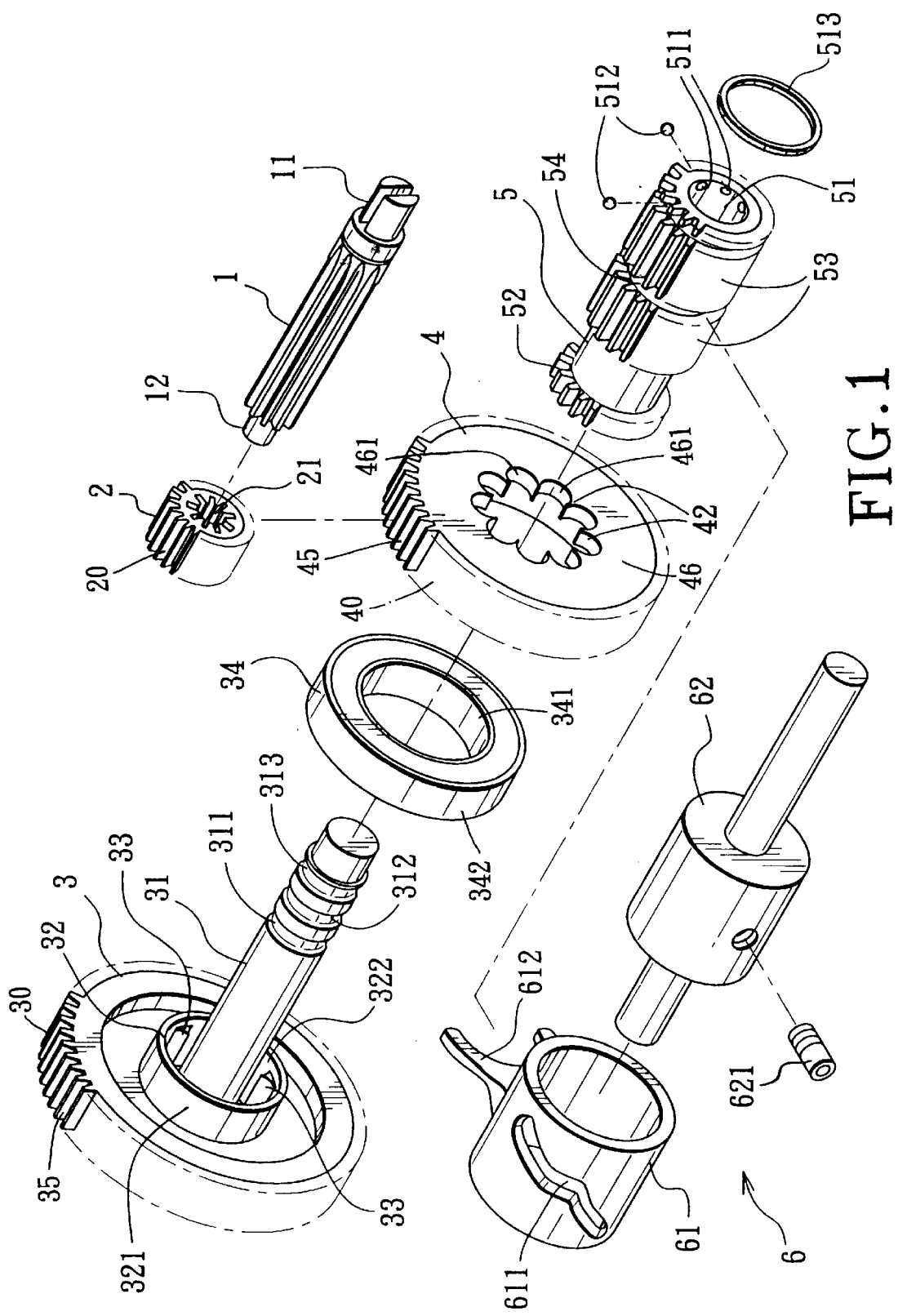
FIG. 1 is an exploded perspective view of a preferred embodiment of a speed changeable gear drive apparatus according to this invention.
Figure 2:
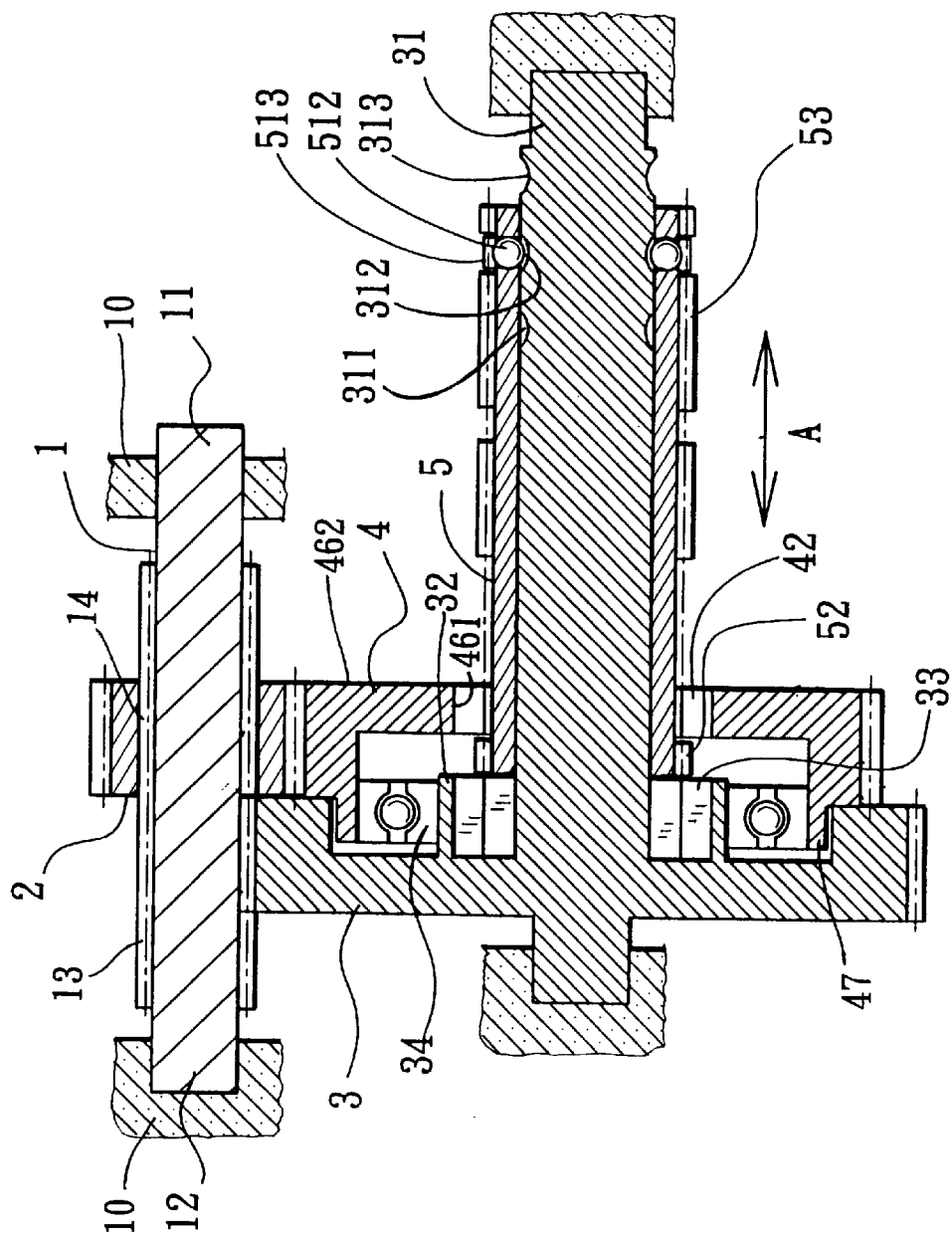
FIG. 2 is a sectional view of the preferred embodiment.

Referring to FIGS. 1 and 2, the preferred embodiment of the speed changeable gear drive apparatus according to the present invention is shown to comprise a pair of frame supports 10, a drive shaft 1, a driven shaft 31, a first driven gear 3, a second driven gear 4, an annular coupling member 5, and a shifting member 6.

The frame supports 10 are disposed to be spaced apart from each other in an axial direction. The drive shaft 1 has two ends 11,12 which are journalled respectively on the frame supports 10 so as to have a first axis oriented in the axial direction. The drive shaft 1 is adapted to couple with and be driven by an output shaft of an electrically powered motor (not shown) to rotate about the first axis. The drive shaft 1 has an annular surrounding wall with a left toothed section 13 serving as first teeth of a first driving gear, and a right toothed section 14 opposite to the left toothed section 13 in the axial direction. A second driving gear 2 has second teeth 20 different in number from the first teeth of the first driving gear, a third inner annular wall which is disposed radially of the second teeth 20, and a plurality of third spline members 21 which are disposed on the third inner annular wall and which couple with the right toothed section 14, thereby rendering the second driving gear 2 to rotate with the drive shaft 1 about the first axis.

The driven shaft 31 extends parallel to the drive shaft 1 to have a second axis journalled relative to the frame supports 10. The driven shaft 31 includes left and right end portions and an intermediate portion interposed therebetween. Annular first, neutral and second ball grooves 311,312,313 are formed in the right end portion, and are spaced apart from one another in the axial direction.

The first driven gear 3 is mounted on the left end portion of the driven shaft 31, and is rotatable with the driven shaft 31. The first driven gear 3 has a first rim portion 30 with third teeth 35 thereon to mesh with the first teeth (i.e. the left toothed section 13 of the drive shaft 1), and a first hub portion 32. The first hub portion 32 includes a first outer annular wall 321 which is radially spaced apart from the first rim portion 30, and a first inner annular wall 322 opposite to the first outer annular wall 321 radially. The first inner annular wall 322 is disposed around and is spaced apart from the left end portion of the driven shaft 31 so as to define an annular coupling area. A plurality of first spline members 33 are disposed on the first inner annular wall 322 and are angularly displaced from one another. An annular bearing member 34 includes an inner annular race 341 which is sleeved on and which is rotatable with the first outer annular wall 321, and an outer annular race 342 which is disposed opposite to and which is rotatable relative to the inner annular race 341 and which is spaced apart from the first rim portion 30 radially to define an annular accommodation area.

The second driven gear 4 is mounted on the intermediate portion of the driven shaft 31, and includes a second rim portion 40 with fourth teeth 45 thereon to mesh with the second teeth 20 of the second driving gear 2, and a second hub portion 46. The second hub portion 46 includes a second inner annular wall 461 radially opposite to the second rim portion 40, and a second intermediate annular portion 462 which is interposed between the second rim portion 40 and the second inner annular wall 461. An annular anchoring member 47 is disposed to be coaxial to and extends from the second intermediate annular portion 462 and towards the first driven gear 3 and into the annular accommodation area so as to be sleeved on and be rotatable with the outer annular race 342 of the annular bearing member 34. A plurality of second spline members 42 are disposed on the second inner annular wall 461 and are angularly displaced from one another.

Figure 3:
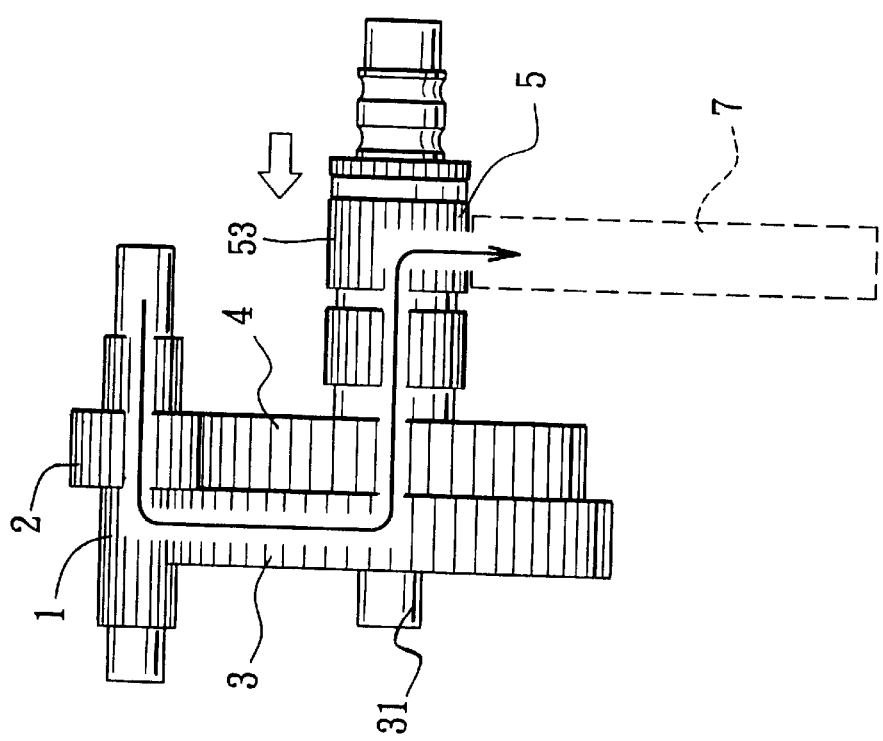
FIG. 3 is a schematic view showing the preferred embodiment in a first position.
Figure 4:
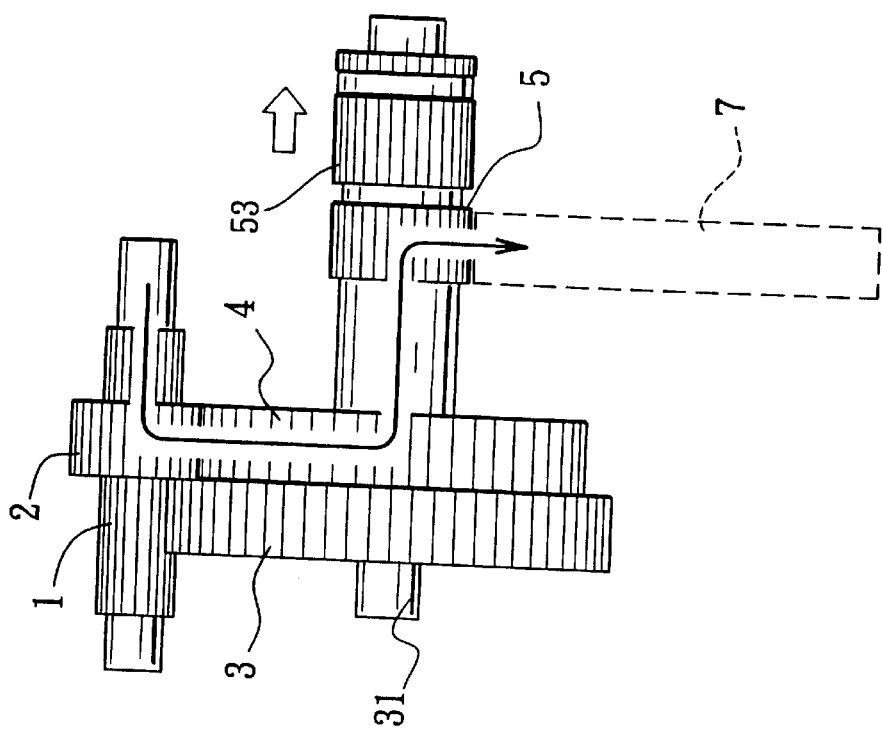
FIG. 4 is a schematic view showing the preferred embodiment in a second position.

The annular coupling member 5 is sleeved on and is retainingly shiftable relative to the driven shaft 31 along the second axis. The annular coupling member 5 includes an output end portion 53 which is adapted to engage a mechanical drive device 7 (as shown in FIGS. 3 and 4) of a wheeled vehicle to drive the wheeled vehicle, and a splined end portion 52 which is spaced apart from the output end portion 53 along the second axis. An annular ball bearing 51 includes a plurality of holes 511 which are formed in the annular coupling member 5 and which are displaced angularly from one another, a plurality of balls 512 which are mounted respectively in the holes 511, and an elastic ring 513 which is sleeved tightly on the balls 512. As such, the annular coupling member 5 can be shifted to a first position, a second position, or a neutral position between the first and second positions in the axial direction (indicated by arrow A in FIG. 2). In the first position, the splined end portion 52 is coupled with the first spline members 33, and the annular ball bearing 51 engages and is rotatable relative to the first ball groove 311 so as to permit the annular coupling member 5 to be rotatable relative to the driven shaft 31 while localizing in the first ball groove 311, thereby transmitting the drive of the first driving gear 3 to the output end portion 53 of the annular coupling member 5, as shown in FIG. 3. In the second position, the splined end portion 52 is coupled with the second spline members 42, and the annular ball bearing 51 engages and is rotatable relative to the second ball groove 313 so as to permit the annular coupling member 5 to be rotatable relative to the driven shaft 31 while localizing in the second ball groove 313, thereby transmitting the drive of the second driving gear 4 to the output end portion 53 of the annular coupling member 5, as shown in FIG. 4. In the neutral position, the splined end portion 52 of the annular coupling member 5 is not coupled with either of the first and second spline members 33,42, and the annular ball bearing 51 engages and is rotatable relative to the neutral ball groove 312 such that the annular coupling member 5 is in a neutral state.

Referring again to FIG. 1, the shifting member 6 includes a rotary portion 62 which is disposed to be rotatable relative to the annular coupling member 5 about the axial direction, a sliding portion 61 which is sleeved slidably on the rotary portion 62 in the axial direction and which has a jaw 612 that engages an annular engaging groove 54 formed in the annular coupling member 5 in a direction radial to the axial direction, and a cam mechanism which includes a keyway 611 and a key 621 that are mounted respectively in the sliding portion 61 and on the rotary portion 62 so as to transmit rotation of the rotary portion 62 to move the sliding portion 61 in the axial direction to shift the annular coupling member 5 between the first and second positions.

As mentioned above, upon being shifted by the shifting member 6, the annular coupling member 5 is shifted to between the first and second positions to change the rotary speed of the mechanical drive device 7 to drive the wheeled vehicle without the need for a motor frequency changer. In addition, the speed changeable gear drive apparatus of this invention has a compact size for mounting on the wheeled vehicle, such as a motorcar.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A speed changeable gear drive apparatus for transmitting a drive of an output shaft of an electrically powered motor to drive a wheeled vehicle, comprising:

a pair of frame supports disposed to be spaced apart from each other in an axial direction;

a drive shaft with a first axis oriented in the axial direction, said drive shaft having two ends journalled respectively on said frame supports, and being adapted to couple with and be driven by the output shaft to rotate about the first axis;

first and second driving gears respectively having first and second teeth in different number and mounted in tandem on said drive shaft and so as to be rotatable therewith;

a driven shaft with a second axis disposed to be journalled relative to said frame supports, said driven shaft extending parallel to said drive shaft, and including left and right end portions and an intermediate portion interposed therebetween;

a first driven gear mounted on said left end portion and rotatable with said driven shaft, said first driven gear having a first rim portion with third teeth thereon to mesh with said first teeth, and a first hub portion which includes a first outer annular wall radially spaced apart from said first rim portion, and a first inner annular wall opposite to said first outer annular wall radially, said first inner annular wall being disposed around and being spaced apart from said left end portion so as to define an annular coupling area;

a plurality of first spline members disposed on said first inner annular wall and angularly displaced from one another;

an annular bearing member including an inner annular race sleeved on and rotatable with said first outer annular wall, and an outer annular race opposite to and rotatable relative to said inner annular race and spaced apart from said first rim portion radially to define an annular accommodation area;

a second driven gear mounted on said intermediate portion, and including a second rim portion having fourth teeth thereon to mesh with said second teeth, and a second hub portion which includes a second inner annular wall radially opposite to said second rim portion, and a second intermediate annular portion interposed between said second rim portion and said second inner annular wall;

an annular anchoring member disposed to be coaxial to and extending from said second intermediate annular portion and towards said first driven gear and into said annular accommodation area so as to be sleeved on and be rotatable with said outer annular race of said annular bearing member;

a plurality of second spline members disposed on said second inner annular wall and angularly displaced from one another;

an annular coupling member sleeved on and retainingly shiftable relative to said driven shaft along the second axis, and including an output end portion adapted to drive the wheeled vehicle, and a splined end portion disposed to be spaced apart from said output end portion along the second axis such that when said annular coupling member is shifted to a first position or a second position, said splined end portion is coupled with said first spline members or with said second spline members so as to transmit the drive of said first driving gear or said second driving gear to said output end portion; and a shifting member disposed to shift said annular coupling member between the first and second positions.

2. The speed changeable gear drive apparatus as claimed in claim 1, wherein said drive shaft has an annular surrounding wall with a left toothed section serving as said first teeth of said first driving gear, and a right toothed section opposite to said left toothed section in the axial direction, said second driving gear having a third inner annular wall disposed radially of said second teeth, and a plurality of third spline members disposed on said third inner annular wall and coupling with said right toothed section, thereby rendering said second driving gear to rotate with said drive shaft.

3. The speed changeable gear drive apparatus as claimed in claim 1, wherein said shifting member is further disposed to shift said annular coupling member to a neutral position between the first and second positions where said splined end portion of said annular coupling member is not coupled with either of said first and second spline members.

4. The speed changeable gear drive apparatus as claimed in claim 3, wherein said driven shaft has annular first, neutral and second ball grooves formed in said right end portion and spaced apart from one another in the axial direction, said annular coupling member having an annular ball bearing which, upon being shifted by said shifting member, selectively engages and is rotatable relative to one of said first, neutral and second ball grooves so as to permit said annular coupling member to be rotatable relative to said driven shaft while localizing in a respective one of the first, neutral and second ball grooves.

5. The speed changeable gear drive apparatus as claimed in claim 1, wherein said shifting member includes a rotary portion disposed to be rotatable relative to said annular coupling member about the axial direction, a sliding portion sleeved slidably on said rotary portion in the axial direction and having a jaw engaging said annular coupling member in a direction radial to the axial direction, and a cam mechanism mounted between said rotary and sliding portions so as to transmit rotation of said rotary portion to move said sliding portion in the axial direction to shift said annular coupling member between the first and second positions.

* * * * *